United States Patent Office 3,037,421
Patented June 5, 1962

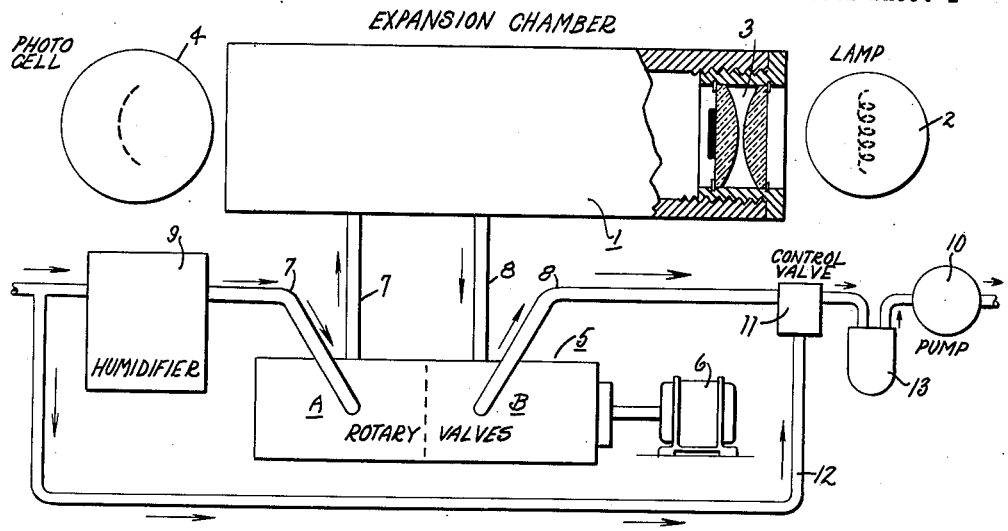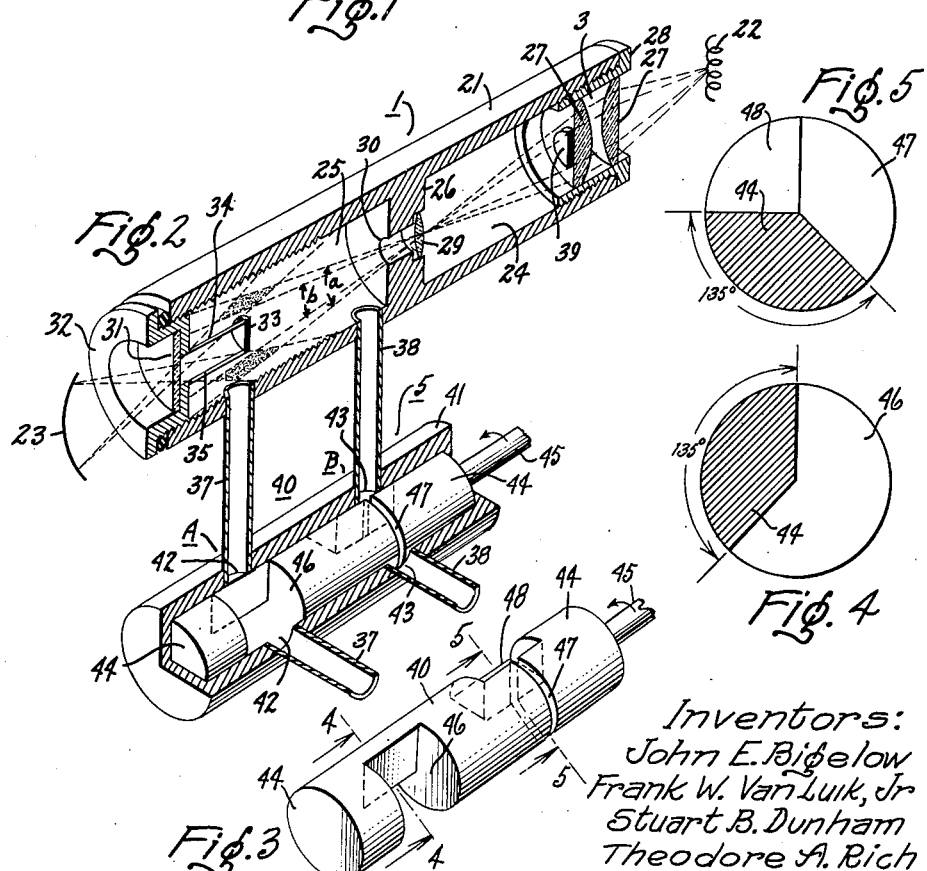

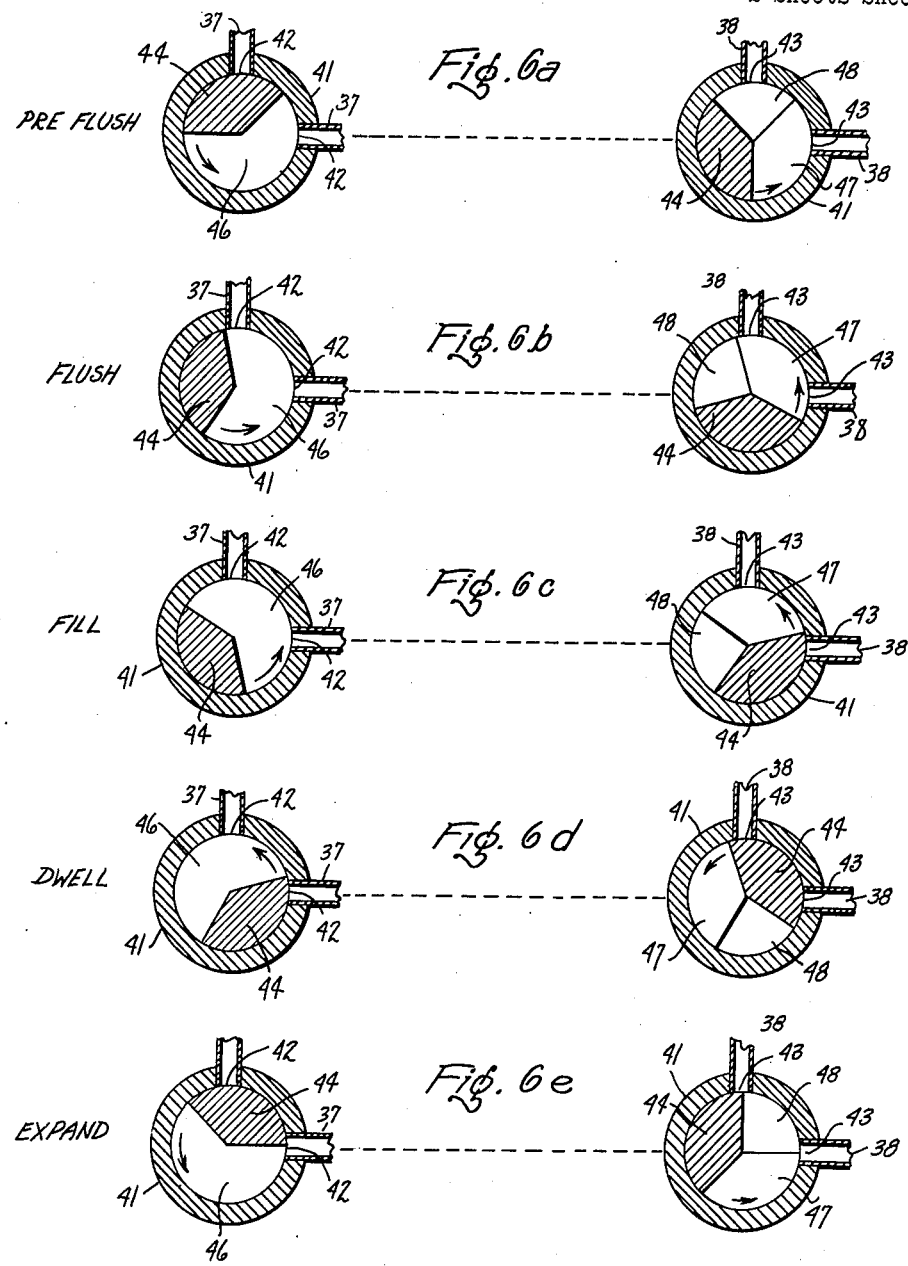

3,037,421
CONDENSATION NUCLEI DETECTOR
John E. Bigelow, Hales Corners, Wis., and Frank W. Van Luik, Jr., and Stuart B. Dunham, Schenectady, and Theodore A. Rich, Scotia, N.Y., assignors to General Electric Company, a corporation of New York
Filed July 27, 1956, Ser. No. 600,540
7 Claims. (Cl. 88—14)

This invention relates to a method and apparatus for measuring small particles, and more specifically those known as condensation nuclei.

Condensation nuclei is a generic name given to small particles which are characterized by the fact that they serve as the nucleons on which water, for example, will condense to form droplet clouds. These nuclei are particles ranging in size from the sub-microscopic to the microscopic. That is, the term condensation nuclei encompasses particles from $2.5 \times 10^{-8}$ centimeter radius to $5 \times 10^{-5}$ centimeter radius.

The nuclei serve as centers about which water droplets form and unless they are present, no condensation will generally occur except at remarkable degrees of supersaturation. That is, it has been observed previously that the condensation of water vapor, or the like, does not take place in the absence of such nuclei at values of supersaturation below 400%, a condition which normally does not occur.

The mechanism involved in the condensation of water vapor about such nuclei is dependent both on the relative humidity and on the size of the nuclei. If the humidity of a gas or air mass tends to rise above 100%, as would occur by a sudden cooling, condensation starts the deposition of water on the nuclei to achieve an equilibrium condition. The deposition of water will continue until the humidity is lowered to the new equilibrium condition representing substantially 100% relative humidity for the new temperature. The relationship between relative humidity and particle size which controls the initiation of condensation on small particles or droplets is shown by the following table:

| Size: | Relative humidity, percent |
|---|---|
| $10^{-7}$ cm. radius | 350 |
| $10^{-6}$ cm. radius | 112 |
| $10^{-5}$ cm. radius | 101 |
| $10^{-4}$ cm. radius | 100.1 |

Condensation nuclei may be produced in many diverse ways. They may be either nature produced or man-made. The primary source for nature produced nuclei are volcanic eruptions, radioactive radiation, salt spray, evaporation of ocean water, atmospheric ionization and dust storms. The primary source of man-made condensation nuclei are combustion processes and electromagnetic radiation.

As a consequence, the ability to measure the number of condensation nuclei in a very accurate fashion is extremely desirable in order to study the various processes, both man-made and natural, which cause the production of these condensation nuclei. That is, an accurate means for measuring the concentrations of condensation nuclei would be extremely useful in meterological and atmospheric studies, air pollution studies, and investigations of combustion processes. Thus it can be seen that an urgent need exists for an accurate and sensitive means of measuring condensation nuclei.

Due to the minute size of condensation nuclei great difficulty is encountered in their measurement since particles lying in the microscopic and sub-microscopic size ranges must be measured. As a result, the usual techniques involving light absorption and light scattering are of no utility since the condensation nuclei themselves are small relative to the wave length of visible light. As a result, there have been developed techniques for measuring condensation nuclei which rely on their property of acting as the nucleus of a water drop. By causing condensation of water about the nuclei, their size is increased by many orders of magnitude so that the usual techniques may be utilized in measuring.

The earliest device utilizing this approach for measuring condensation nuclei was the so-called Aitken counter. In this instrument, the air under test is brought into a chamber lined with a wet blotter. A manually operated piston expands and cools the air thus raising the relative humidity above 100% and causing water to condense about the nuclei. The water drops thus formed are deposited on a square glass slide and are counted with a low power microscope. The Aitken counter, however, was and is an agonizingly difficult instrument to use. First, the counting of the water droplets on the slide is an extremely tedious and lengthy operation. Furthermore, the instrument is extremely erratic in that few consistent readings can be obtained. As a result it is necessary to take the average of quite a number of readings in order to be even vaguely certain of the results. Since it is necessary to take an average of several readings in order to obtain data which is even fairly accurate, this method is extremely time consuming and the device is most unsatisfactory for measuring conditions in which the nuclei concentration are varying rapidly. Thus the inherent inaccuracy of the Aitken counter as well as its extremely slow response, makes it a most unsatisfactory device to use.

Some of the major shortcomings of the Aitken counter are avoided by the Nolan counter. In this device, the air sample is brought into a closed chamber which is traversed by a light beam. The air sample to be measured is pressurized by pumping in filtered air. Then the pressurized gas is allowed to come to atmospheric pressure by opening a valve in the chamber. The resultant expansion produces a fog of water droplets causing attenuation of the light beam traversing the chamber. The attenuated light then provides an indication of the fog and, consequently, of the number of nuclei present. The Nolan counter solved several of the difficulties presented by the Aitken counter in that rapid and reproducible readings are obtainable by means of this device. However, the Nolan counter also has several serious shortcomings. For all except very high concentrations of nuclei, the attenuation of light intensity in passing through the cloud formed in the chamber is so small that, in order to obtain a measurable indication, it is necessary to employ a very long chamber. Consequently, within the range of reasonable physical dimensions, the Nolan counter has a sensitivity over only a very small range of condensation nuclei concentrations. As a result, although the Nolan counter was a substantial improvement over the Aitken device, it has only limited utility due to its inherent lack of sensitivity.

Another significant prior art device for measuring condensation nuclei, which avoided some of the deficiencies of the Nolan and Aitken counters, is the Vonnegut counter. The Vonnegut counter is described in Patent No. 2,684,008 issued on July 20, 1954, to Bernard Vonnegut. In the Vonnegut apparatus the air or gas samples to be tested are brought to a 100% relative humidity by means of a humidifying device such as a bubbler. The humidified air samples are introduced into an expansion chamber by means of a pressure sensitive flutter valve. The humidified air samples in the chamber are periodically expanded by means of a flexible diaphragm which is cyclically driven by a constant speed motor. The movement of the bellows alternately expands and contracts the volume of the chamber thus periodically expanding and compressing the air in the chamber.

During the outward displacement of the flexible diaphragm the air within the container is expanded and adiabatically cooled causing supersaturation and in turn condensation of the water vapor about the nuclei. The chamber is traversed by a beam of light which is scattered by the cloud of droplets within the chamber. The scattered light produces an electrical signal which is a measure of the condensation nuclei present. In the latter part of the operating cycle, the flexible diaphragm is inwardly displaced and in turn compresses the air in the chamber causing the droplets to be evaporated and expelling the air sample through an exhaust conduit and a filter. The cycle of operation is then repeated to provide a continuous indication of the number of condensation nuclei present.

The Vonnegut apparatus provides solutions for a number of problems and deficiencies found in the Aitken and Nolan devices. Since scattered light rather than attenuated light is utilized to provide a measure of the number of condensation nuclei, a great increase in sensitivity is achieved since, unlike the Nolan counter, it is possible to read relatively low concentrations of nuclei. Furthermore, the device of Vonnegut operates continuously and consequently constitutes an automatic device for monitoring the condensation nuclei levels in a given area, whereas the Nolan device is manually operated.

Although the Vonnegut device has many advantages over the prior art devices, it has certain limitations. In the Vonnegut device the air is expanded by means of a volume defined expansion inasmuch as the volume of the chamber is varied by a piston, diaphragm, or such, moved in a geometrically defined manner. As a consequence, the speed of response is slow. That is, it is desirable that the ultimate degree of supersaturation be reached very quickly in order to prevent condensation from starting before the desired degree of supersaturation is reached. By utilizing a volume defined expansion the pressure drops slowly and condensation begins almost immediately with its attendant release of heat and reduction of relative humidity. Thus it is difficult to reach a desired degree of supersaturation and as a consequence it is difficult to tell precisely what expansion ratio is reached. As a result the readings obtained may not provide the necessary degree of precision where an extremely high degree of precision is desired.

Furthermore, since a flutter valve is utilized to admit the air samples into the expansion chamber, a certain ambiguity in the results may be present due to the fact that valves of this type are somewhat erratic as to the pressure at which they operate. Consequently, the operation of the valve does not necessarily introduce a sample of the same size into the chamber with each operation. This presents certain difficulties, since a device of this type has a detection sensitivity of the order of one part by weight in $10^{14}$ part by weight of air, and any difference in the size of sample pulled into the expansion chamber upon successive cycles could present a substantial error in the output readings.

Furthermore, the removal of prior air samples depend upon the compression of the air sample in the chamber and consequent expulsion through an output conduit. This manner of expelling the previous sample is somewhat imprecise since it is difficult, in this fashion, to remove the prior sample completely from the chamber. As a result the indications may be somewhat ambiguous since it is unclear how much of the indication is due to the new sample and how much due to the remainder of the old sample. A further consequence of this manner of expelling the old sample, is that the apparatus has a slower response than is desirable since it takes a substantial time to clear the prior contamination out completely. That is, the Vonnegut device does not have a very precise flushing action, which permits the complete removal of prior samples before a new sample to be tested is admitted to the expansion chamber.

It is an object of this invention, therefore, to provide a condensation nuclei measuring apparatus and method which is extremely accurate and yet has very fast response.

A further object of this invention is to provide a condensation nuclei measuring apparatus in which the expansion ratio of the tested samples is accurately controlled.

Yet another object of this invention is to provide a condensation nuclei measuring apparatus in which the expansion of the tested samples is pressure defined.

Still another object of this invention is to provide a condensation nuclei measuring apparatus and method in which contamination of test samples by previous samples is avoided.

Further objects and advantages will appear as the description of the invention proceeds.

In accordance with the invention, a novel condensation nuclei measuring device is disclosed which has a very high order of accuracy and an extremely fast response time. The novel apparatus comprises an expansion chamber traversed by a beam of light which chamber is adapted to hold air or gas samples containing condensation nuclei. The input and output conduits to the expansion chamber are controlled by a pair of rotary valve means which permit a controlled and very accurate operating cycle. The expansion of the sample in the chamber is achieved by a pressure defined expansion, that is, a pressure difference is established between the chamber and a source of infinite pressure, such as a pump. The output valve operates to permit expansion of the gas sample periodically into the source of lower pressure and a very rapid expansion of the gas sample is achieved. Consequently, a very precisely controlled level of supersaturation of the sample is possible and, consequently, a high level of accuracy may be achieved. In addition, the rotary valves are so constructed that one portion of the cycle permits a thorough flushing of the expansion chamber so as to remove completely prior contaminated samples preventing any erroneous readings attributable thereto.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIGURE 1 shows a view partially in cross section of the novel apparatus of the invention.

FIGURE 2 is a fragmental perspective partially in cross section of the expansion chamber and rotary valves of FIGURE 1.

FIGURE 3 is a perspective view of the valve rotor of FIGURE 2.

FIGURE 4 is a sectional view of the valve rotor taken along the line 4—4 of FIGURE 3.

FIGURE 5 is another sectional view of the valve rotor taken along the lines 5—5 of FIGURE 3.

FIGURES 6a–6e are diagrams illustrating the relative position of the valve during different portions of the operating cycle.

Referring now to FIGURE 1, there is shown an embodiment of a condensation nuclei detecting apparatus illustrating the instant invention. There is provided an elongated expansion chamber 1 into which air samples are periodically introduced and expanded in order to form droplet clouds. A beam of radiant energy is provided by an incandescent lamp 2, or any other similar source of radiant energy, positioned adjacent to one end of the expansion chamber 1. The beam of radiant energy from the incandescent lamp 2 traverses the expansion chamber 1 by virtue of an optical system 3 mounted therein, shown in greater detail in FIGURE 2 and to be discussed later in connection therewith. A radiation sensitive device 4, such as a photoelectric cell or a photomultiplier device, is positioned adjacent to the other end of the expansion chamber 1 and functions to intercept any light scattered in the expansion chamber by the periodic formation of droplet clouds within the chamber. The optical system within the chamber is so designed that no light falls on the radiataion sensitive device 4 in the absence of a droplet cloud within the chamber. The precise manner in which this is achieved will be discussed in detail later with reference to FIGURE 2. Only upon the occurrence of such a cloud is light scattered within the chamber and caused to fall on the radiation sensitive device 4. Any scattered light falling on the radiation sensitive device 4 functions to produce a periodic electrical signal in its output which may be connected to a measuring or recording instrument, not shown, in order to provide a measure of the number of condensation nuclei present.

Additionally, there is provided a means for periodically expanding the condensation nuclei containing samples in the chamber 1. To this end, there is provided a valve means 5 consisting of a first valve portion A and a second valve portion B. The valve means 5 is of the rotary type and may be most clearly seen with reference to FIGURES 2 and 3, and functions, broadly speaking, to control the periodic admission of gas samples into the expansion chamber 1 and the subsequent expansion thereof in order to produce droplet clouds. The rotary valve means 5, as will be explained in greater detail later, consists of a bored cylindrical valve body and a rotor driven by a motor 6. The rotor of the valve means 5 has a number of recessed portions operative to perform the valving function. Rotary valve means A is connected in an input conduit 7 and periodically permits the introduction of air samples into the expansion chamber 1. The rotary valve means B is connected in an output conduit 8 and operates to permit the periodic expansion of the gas samples in the chamber in order to form droplet clouds.

Also connected in the input conduit 7 is a humidifying element 9 which functions to bring the samples to 100% relative humidity. The humidifier 9 may be any one of many well-known types and may be a sealed compartment having wicks dipped into a water container. Air passes downward between the wicks on one side of a barrier, through a hole in the barrier and back up the other side. In this fashion gas samples brought into this humidifier are brought to 100% humidity. Other types of humidifiers may, of course, be utilized. Thus, for example, if desired the bubbler type of humidifier such as is shown in the Vonnegut patent, referred to above, may be utilized. It may also be desirable to position the humidifier 9 in close physical proximity to the expansion chamber 1 in order to avoid troublesome temperature differentials between the humidifier and the expansion chamber.

The output conduit 8 is connected to a pump 10 through a control valve 11 and a water trap 13. The pump 10 provides an infinite source of lower pressure and functions to expand the gas samples in the chamber 1 through the valve means 5 to a pressure determined by the control valve 11, thus providing a rapid pressure defined expansion. The control valve 11 is connected to the output conduit 8 and to an input line 12, and functions to limit the pressure differential applied to the samples in the expansion chamber. The control valve permits air to bleed into the pump line from the input line 12 if the pressure differential reaches a preset value. This may be achieved by any number of well-known control valve means. For example, a spring force may be balanced against the air pressure force from line 12 which is exerted against a washer. If the air pressure force is great enough, air flows into the pump line and reduces the pressure differential. In this fashion, a constant differential is maintained and a fixed degree of expansion of the gas samples in the chamber 1 may be achieved. In utilizing a pressure defined expansion of this type it is vital that a constant pressure differential be maintained since too low a differential would not give the proper degree of expansion and supersaturation required to cause condensation on small nuclei. On the other hand, too high a differential would cause either spontaneous condensation or condensation on charged molecules which causes the desired signal to be masked. Furthermore, variations in the pressure differential would, of course, introduce ambiguities and errors into successive readings. As a result, a control valve is desirable in order to maintain the constant pressure differential.

The operation of the apparatus of FIGURE 1 is such as to permit a precise and specified cycle of operations. The sample to be tested enters the humidifier 9 where it is brought to 100% relative humidity and to the temperature of the chamber. This occurs during a portion of the operational cycle denominated as the flush portion. At this time, rotary valve A is open and valve B is partly open so the pump 10 can draw air right through the system in order to remove the previous sample as well as to bring the new sample into the expansion chamber. The humidified air then passes through the valve A to the expansion chamber 1. During the fill part of the cycle, valve B closes, stopping flow out of the expansion chamber 1. Valve A, however, is still open so that air continues to flow in until inlet pressure is reached. The dwell part of the cycle then occurs in order to permit the gas sample in the expansion chamber to reach an equilibrium condition. That is, valve A closes and valve B which has been closed previously remains closed allowing an overlap in the valves. During this dwell portion of the cycle, the gas sample in the expansion chamber is permitted to reach equilibrium conditions.

The next and final portion of the cycle is the expand portion during which the gas sample is permitted to undergo a pressure defined expansion in order to form a cloud of droplets about the condensation nuclei present in the sample. At the start of the expand part of the cycle, valve B opens fully and the pump 10 quickly pulls chamber pressure down to that determined by the pump 10 and the control valve 11. The sudden expansion cools the air in the chamber. The amount of water vapor in the air which was 100% of what could be retained at the former temperature (i.e. 100% relative humidity) will be more than 100% of what can be retained at the cooler temperature. Thus, a condition of supersaturation exists instantaneously within the chamber. As a result of the supersaturation, water vapor condenses on the condensation nuclei to produce droplet clouds. The light passing through the chamber 1, is scattered by the droplet cloud so that a portion of it reaches the radiation sensitive device 4 which is otherwise unilluminated. As a result, an electrical signal is produced in the output of the radiation sensitive device 4 once per cycle. This electrical signal provides a measure of the number of nuclei present, since the amount of scattering of the light is dependent on the number of nuclei about which droplets are formed.

At the start of the next cycle, valve A reopens to initiate the flush cycle permitting complete removal of the previous sample. The pressure in the chamber goes back up, and consequently the air temperature therein rises and the droplets evaporate. Valve B is now only partially open and valve A is completed open so that the flush portion of the next cycle is initiated. The cycle described above may be repeated approximately 5 times per second, so that the output frequency of the radiation sensitive device 4 has a frequency of 5 cycles per second. That is, the motor 6 driving the rotor of the valve means 5 has a speed of 5 revolutions per second. It is obvious, of course, that the cycle frequency just described is a matter of choice and that other cycle frequencies may be utilized without departing from the spirit of the instant invention.

As was pointed out with reference to FIGURE 1, the expansion chamber in conjunction with the rotary valve means constitutes the means by which samples of gases are periodically drawn into the apparatus and caused to undergo an expansion in order to produce detectable droplet clouds.

FIGURE 2 illustrates, in detail, a preferred embodiment of an expansion chamber and rotary valve means which may be utilized in the apparatus of FIGURE 1. There is provided a cylindrical chamber 21 having a source of radiant energy, such as the incandescent lamp 22, positioned next to one end thereof. Mounted adjacent the other end of the chamber 21, is a radiation sensitive device 23 of the same type disclosed and described with reference to FIGURE 1. The chamber 21 consists of two chamber portions 24 and 25 separated by means of a divider wall 26 having an elongated cylindrical passage 30 therein. The chamber portion 25 comprises the cloud forming chamber wherein the gas samples are caused to undergo expansion and form droplet clouds. An input conduit 37 and an output conduit 38 is provided for admitting the gas samples and for subjecting them to expansion by means of a pump such as illstrated in FIGURE 1.

Mounted within the chamber 21 is an optical system which functions to project the beam of radiant energy through the chamber in such a manner that light falls on the radiation sensitive device only if a droplet cloud is present in the cloud chamber 25 to scatter light. A pair of condensing lenses 27 are positioned at one end of the chamber 21 in a threaded lens mount 28. The condensing lenses 27 are positioned adjacent to the incandescent lamp 22 and function to focus the beam of light to make an image thereof at the dividing barrier 26. A divider lens 29 is positioned within the divider wall 26 and projects the beam of light which has been focused thereon through the cylindrical passageway 30 and into the cloud forming chamber 25. Since the light from the incandescent source 22 is focused at the divider lens 29, the divider lens acts effectively like a source at this point of the chamber. Thus, there is produced within the cloud chamber 25 a cone of light subtending an angle "*a*" as shown in FIGURE 2.

Positioned at the other end of the chamber 21 and adjacent to the radiation sensitive device 23 is a transparent window 31 positioned within a threaded mounting 32 and directly in front of the radiation sensitive device 23. In order that only light scattered by droplets within the cloud chamber 25 impinge upon the radiation sensitive device 23 and that none impinge thereon in the absence of droplets, an opaque light carrier 33 of circular configuration is positioned in front of the window 31 in order to block any direct light path from the divider lens 29. The light barrier 33 is fastened to the mounting member 32 by means of struts 34 and 35.

In order to prevent stray light due to multiple reflections of the incoming ray from affecting the radiation sensitive device 23, the interior surface of the cloud chamber 25 in the vicinity of the window 31 is threaded in order to absorb such reflected light by multiple reflections from the threaded portions. In addition, the end of the chamber 25 may be painted black or covered with black velvet in order to minimize further any stray reflected light.

If a cone of light subtending the angle "*a*" were projected toward the window 31 and its attendant light barrier 33, it is possible that some of the rays in this cone of light would strike the edge of the barrier and would be diffracted towards the window 31 and would thus contribute to an erroneous and inaccurate reading. In order to avoid such a possibility, it is desirable to provide a cone of darkness subtending an angle "*b*" encompassing the light barrier 33 within the cone of light subtending the angle "*a*." To this end there is provided an opaque circular disc 39 positioned on the face of one of the condensing lenses 27. In this fashion there is produced a cone of darkness within the cone of light. The angle subtended by the cone of darkness being such that the edge of the light barrier 33 is kept dark. As a result, only the light in the angular volume which is illuminated by rays in the cone of light and in the sight of the radiation sensitive device is effective for producing a scattered light signal. This angular volume is illustrated in FIGURE 2 by means of the dotted portion. As a result, the radiation sensitive device 23 intercepts a substantial portion of the light scattered by droplet clouds in the forward direction. In this way a very sensitive means is provided for measuring the number of droplets within the cloud forming chamber 25.

A rotary valve means 40 is provided in order to control the admission of gas samples into the cloud forming chamber 25 and the subsequent expansion of the gas samples. The valve means 40 consists of a valve body 41 having a cylindrical bored portion therein. The input conduit 37 extends through the valve body 41 to form a first pair of ports 42 extending into the bore and positioned at an angle of 90° relative to each other. The output conduit 38 similarly extends through the valve body 41 into the bore to provide a second pair of ports 43 positioned at right angles to each other. Positioned within the cylindrical bore of the valve body 41 is a rotary member 44 fastened to a shaft 45 driven by a motor, not shown, such as is illustrated in FIGURE 1.

The rotor 44 has a circumferentially extending recessed portion which is alignable with the first pair of ports 42 upon rotation of the rotor 44. The recessed portion 46 permits the flow of gas samples into the cloud chamber 25 through the input conduit 37 when the recessed portion 46 is in alignment with the ports 42. The recessed portion 46 is of substantial width and, in a preferred embodiment, subtends an angle of approximately 225°, as may be seen most clearly in FIGURE 4 which is a section taken along the line 4—4 of FIGURE 3.

Axially displaced from the recessed portion 46 is a second recessed portion, controlling flow through the output conduit 38, which permits the periodic expansion of the cloud samples within the cloud chamber 25. This second recessed portion consists of a relatively wide circumferentially extending recessed section 48 and a relatively narrow circumferentially extending slotted section 47 connected thereto. As may be seen most clearly with reference to FIGURE 5, which is a section taken along the line 5—5 of FIGURE 3, the wide recessed portion 48, in a preferred embodiment, extends for an angle of approximately 90° whereas the narrow slot portion 47 extends for approximately 135°. The recessed portions 46, 47 and 48 are so positioned around the circumference of the rotor body 44 that they are simultaneously in alignment with their respective ports 42 and 43 during one portion of the cycle and out of alignment during another. The relation of the recessed portions to their respective ports during different points in the operating cycle can be most advantageously seen in FIGURES 6*a*–6*e*.

Referring now to FIGURES 6*a*–6*e*, there is illustrated, diagrammatically, the valve rotor positions relative to the ports 42 and 43 during various stages of the operational cycle. The left hand portion of each figure shows the relation of the rotor to the ports 42 in order to control input conduit 37 while the right portion shows its relation to ports 43 and the output conduit 38. Referring specifically to FIGURE 6*a*, the rotor position prior to the inception of a fresh cycle is illustrated. That is, the previous sample in the cloud forming chamber 25 has been expanded and a new cycle is about to begin. As can be seen from reference to the left hand portion of FIGURE 6*a*, the input conduit 37 is shut off and no gas travels therethrough since the recessed portion 46 is not in alignment with port members 42. The output conduit, on the other hand, is open permitting expansion of air in the cloud chamber 25 since the recessed portions 48 and 47 are in alignment with the port members 43.

Upon further rotation of the rotor member 44 the next portion of the operating cycle, and more specifically, the flush portion of the next cycle begins. FIGURE 6*b* shows the relative position of the rotor and the port members during the first portion of the new cycle during which the old sample is flushed out of the cloud forming chamber 25 in order to remove the previously measured sample. The input conduit 37 is now open permitting new samples to be drawn into the cloud forming chamber. This can be most clearly seen in the left hand portion of FIGURE 6b since the recessed portion 46 has now come into alignment with the port members 42 permitting the flow into the chamber. The output conduit 38 similarly permits the flow of air therethrough since the recessed portions 48 and 47 are still in alignment with the ports 43. In this manner the pump draws the old sample out of the cloud chamber while simultaneously bringing in fresh samples through the input conduit 37. During the flush portion, it can be seen that the flow through the output conduit 38 is limited in magnitude since the narrow recessed portion 47 is in alignment with the ports 43 thus limiting the amount of flow out of the chamber and preventing excess pressure differentials between the inlet and the chamber.

Upon further rotation of the rotor member 44, the next or fill portion of the cycle is initiated. As can be seen in FIGURE 6c, during the fill portion of the cycle the input conduit 37 remains open permitting the flow of air into the cloud chamber since the recessed portion 46 continues to remain in alignment with the ports 42. However, the output conduit 38 has been shut off since the recessed portions 47 and 48 are no longer in complete alignment with the ports 43. As a result air no longer flows out of the chamber, while air continues to flow in through the inlet conduit 37 until the sample in the cloud chamber reaches inlet pressure.

Following the fill portion of the cycle, the inlet conduit 37 is closed and the dwell portion of the operating cycle is initiated. The relative position of the rotors and the recessed portions can be most clearly seen in FIGURE 6d. In the left hand portion of FIGURE 6d it can be seen that the recessed portion 46 is no longer in alignment with both ports 42. As a result air or gas cannot flow therethrough and through the input conduit 37 into the chamber. Similarly the output conduit remains closed preventing flow out of the chamber. As can be seen from the right hand portion of FIGURE 6d, the recessed portion 47 and 48 are also not in alignment with the port members 43. As a result the fresh sample in the chamber 25 is permitted to come to an equilibrium condition before it is subjected to expansion.

Thes next portion of the operating cycle is the expand portion during which the sample within the cloud chamber 25 is permitted to expand to a lower pressure by means of a pump such as is illustrated in FIGURE 1. As can be seen in FIGURE 6e the output conduit 38 is now opened since the recessed portion 48 has now come into alignment with the ports 43. As was pointed out previously, the recessed portion 48 is relatively large in magnitude thus permitting a very rapid flow and consequently a very rapid reduction in pressure of the sample in the chamber. The input conduit 37, however, still remains closed since the recessed portion 46 is as yet not in alignment with the ports 42 as may be clearly seen in the left hand portion of FIGURE 6e.

The rapid expansion of the sample in the cloud chamber, as has been pointed out previously, permits the condensation of water about the condensation nuclei and causes the formation of a cloud of droplets within the chamber.

After the expansion of the sample as illustrated in FIGURE 6e, the cycle repeats initiating with a flushing cycle which now removes the sample from the cloud chamber and introduces a new sample as shown in FIGURE 6*b*. This permits a very precise control of the expansion ratio of the sample as well as of its removal. As a result, a very accurate indication of the number of condensation nuclei present may be obtained.

Although a rotary valve embodying but a single rotor member having separate recessed portions is disclosed in order to control flow through the input and output conduits, it is obvious, of course, that two separate rotary valves may be utilized without going outside of the spirit of the instant invention. Similarly although certain configurations of the recessed portion is illustrated, it is quite possible to utilize configurations of many different types while still falling within the spirit of the instant invention.

While a particular embodiment of this invention has been shown it will, of course, be understood that it is not limited thereto since many modifications both in the arrangement and in the instrumentalities employed may be made. It is contemplated by the appended claims to cover any such modifications as fall within the true spirit and scope of this invention.

What we claim as new and desire to secure by Letters Patent of the United States is:

1. In a condensation nuclei detecting apparatus, the combination comprising a chamber for holding humidified nuclei bearing gaseous samples, said chamber having inlet and outlet conduits, means to expand said gaseous samples periodically to produce droplet clouds within said chamber, said means including a first valve means disposed in said inlet conduit to permit gas samples to be drawn into said chamber and second valve means disposed in said outlet conduit to permit said gas samples to be expanded, electro-optical means positioned to view the interior of said chamber and measure the droplet cloud density as an index of the nuclei concentration, and means to operate said first and second valves in a predetermined sequence whereby samples are first drawn into said chamber and then expanded to form said droplet cloud.

2. In a condensation nuclei detecting apparatus, the combination comprising means defining a chamber for holding humidified nuclei bearing gaseous samples, said chamber means having inlet and outlet conduits communicating therewith, means to expand said gaseous samples periodically to produce droplet clouds within said chamber, said last named means including a first rotary valve means disposed in said inlet conduit to permit samples to be drawn into said chamber and a second rotary valve means disposed in said outlet conduit to permit samples in said chamber to be expanded, common driving means for said first and second valves to operate said valves in a predetermined sequence whereby samples are first drawn to said chamber and then expanded to form droplet clouds, and electro-optical means positioned to view the interior of said chamber and measure the density of said droplet clouds as an index of the nuclei concentrations.

3. In a condensation nuclei detecting apparatus, the combination comprising means defining a chamber for holding humidified nuclei bearing gaseous samples, inlet and outlet conduit means communicating with said chamber, means to expand said gaseous samples periodically to produce droplet clouds within said chamber, said last named means including a valve means having a body portion containing a cylindrical bore, a first pair of ports extending into said bore and communicating with said inlet conduit, a second pair of ports extending into said bore and communicating with said outlet conduit, a rotary member positioned within said bore having a first recessed portion alignable with said first pair of ports to permit said samples to be drawn into said chamber, a second recessed portion alignable with said second pair of ports to permit expansion of said gaseous samples in said chamber, said recessed portions being so positioned that during each rotation of said member a valving sequence is produced whereby gaseous samples are first drawn into said chamber and then expanded to form said droplet clouds, and electro-optical means positioned to view the interior of said chamber continuously and measure the density of the droplet cloud as a measure of the number of nuclei.

4. In a condensation nuclei detecting apparatus, the combination comprising means defining a chamber for holding humidified nuclei bearing gaseous samples, inlet and outlet conduits communicating with said chamber, means to expand said gaseous samples periodically to produce droplet clouds within said chamber, said last named means including a rotary valve means having a body with a cylindrical bore, axially spaced first and second pairs of ports extending into said bore and communicating respectively with the inlet and outlet conduits, a rotary member mounted within said bore having axially spaced circumferentially recessed portions sequentially alignable with first and second pair of ports, means to rotate said rotary member to produce a valving sequence whereby samples are first drawn into said chamber and then expanded to form said droplet cloud, and electro-optical means positioned to view the interior of said chamber continuously and measure the density of said droplet clouds as an index of the nuclei concentration.

5. In a condensation nuclei detecting apparatus, the combination comprising means defining a chamber for holding humidified nuclei bearing gaseous samples, an inlet conduit communicating with said chamber, an outlet conduit communicating with said chamber, means to expand said gaseous samples periodically to produce droplet clouds within said chamber, said means including a valve body means having a cylindrical bore and a first pair of ports extending into said bore and communicating with said inlet conduit, a second pair of ports extending into said bore and communicating with said outlet conduit, a rotary member mounted within said bore having a first recessed portion alignable with said first pair of ports, and a second recessed portion including a restricted portion alignable with said second pair of ports, means to drive said rotary member to produce a valving sequence whereby samples are first drawn into said chamber, are expanded to form said droplet clouds and then caused to flow out of said chamber through said recessed portion and subsequently through said restricted portion on said rotary member, and electro-optical means positioned to view the interior of said chamber continuously and measure the droplet cloud density as an inlex of the nuclei concentration.

6. In a condensation nuclei detecting apparatus, the combination comprising a chamber having inlet and outlet means for holding humidified nuclei containing gas samples, pump means connected to said outlet means to expand said samples, valve means in said inlet and outlet means to permit samples to be drawn into said chamber periodically and expanded periodically by said pump means to produce cloud droplets about any nuclei, said valve means including a valve body having a cylindrical bored portion and a first pair of radial ports extending into said bored portion and connected to said inlet means, a second pair of radial ports extending into said bored portion and connected to said outlet means, a cylindrical rotary member mounted in said bored portion having a first circumferentially extending recessed portion alignable with said first pair of ports upon rotation of said rotary member, and a second recessed portion including a restricted portion alignable with said second pair of ports upon rotation of said rotary member to permit expansion of said samples and to limit flow when said restricted portion is aligned with said second pair of ports, means to produce a beam of radiant energy traversing said chamber which is periodically scattered by said droplet clouds, radiation sensitive means to intercept said scattered radiant energy to produce periodic electrical signals as a measure of the number of nuclei present.

7. In a condensation nuclei detecting apparatus, the combination comprising a chamber adapted to hold humidified nuclei bearing gaseous samples, said chamber having conduit means to permit the admission and removal of said gaseous samples, means to expand said samples periodically to produce droplet clouds within said chamber including a first positive valving means disposed in said conduit means to permit said samples to be drawn into said chamber and second positive valving means disposed in said conduit means to permit said samples to be expanded, means to operate said first and second valving means in a predetermined sequence whereby samples are first drawn into said chamber and then expanded to form said droplet clouds and means positioned adjacent to said chamber to measure the density of said droplet cloud as an index of the nuclei concentration.

References Cited in the file of this patent

UNITED STATES PATENTS

| | | |
|---|---|---|
| 1,608,812 | Reeves | Nov. 30, 1926 |
| 2,042,095 | Grant | May 26, 1936 |
| 2,118,836 | Carter | May 31, 1938 |

FOREIGN PATENTS

| | | |
|---|---|---|
| 406,648 | Great Britain | Feb. 26, 1934 |

OTHER REFERENCES

Cloud Chamber for Counting Nuclei in Aerosols, by Bernard G. Saunders; The Review of Scientific Instruments, vol. 27, No. 5, May 1956, pages 273–277.